United States Patent
Botosan et al.

(10) Patent No.: US 7,658,691 B2
(45) Date of Patent: Feb. 9, 2010

(54) AUTOMATIC TRANSMISSION WITH IMPROVED SHIFT QUALITY

(75) Inventors: Valentin Botosan, Rochester Hills, MI (US); Gary J. Binienda, Clarkston, MI (US); Mark R. Champine, Carmel, IN (US)

(73) Assignee: Chrysler Group LLC, Auburn Hills, MI (US)

( * ) Notice: Subject to any disclaimer, the term of this patent is extended or adjusted under 35 U.S.C. 154(b) by 474 days.

(21) Appl. No.: 11/615,293

(22) Filed: Dec. 22, 2006

(65) Prior Publication Data

US 2008/0153668 A1    Jun. 26, 2008

(51) Int. Cl.
    *F16H 61/06* (2006.01)
(52) U.S. Cl. ..................................................... 475/128
(58) Field of Classification Search ........................ None
    See application file for complete search history.

(56) References Cited

U.S. PATENT DOCUMENTS

| | | | | |
|---|---|---|---|---|
| 3,823,621 A | * | 7/1974 | Kubo et al. ................. | 477/154 |
| 4,515,176 A | * | 5/1985 | McCarthy et al. ...... | 137/115.15 |
| 5,085,102 A | * | 2/1992 | Iwase et al. .................. | 477/137 |
| 5,115,698 A | | 5/1992 | Leising et al. | |
| 5,211,080 A | | 5/1993 | Leising et al. | |
| 5,730,685 A | * | 3/1998 | Younger ...................... | 477/156 |
| 5,890,509 A | * | 4/1999 | Becker et al. .......... | 137/115.26 |
| 2005/0215395 A1 | * | 9/2005 | Morise et al. ............... | 477/158 |

* cited by examiner

*Primary Examiner*—Sherry Estremsky
(74) *Attorney, Agent, or Firm*—Ralph E. Smith

(57) ABSTRACT

A modification to the manual valve of an automatic transmission is provided which improves the shift quality of the automatic transmission when the transmission is shifted from a drive gear to either Park or Neutral. More particularly, the invention provides a control orifice which regulates the release of hydraulic fluid from one or more clutch circuits such that pressure to one or more clutches is gradually released. The gradual release of pressure form the one or more clutches provides an improved shift quality. In alternate embodiments, the present invention provides a further modification to an automatic transmission which allows the control orifice to be circumvented in situations where a rapid swap of pressure from on clutch control solenoid to another is required.

9 Claims, 6 Drawing Sheets

DRIVE – FIRST

PRIOR ART

DRIVE - FIRST

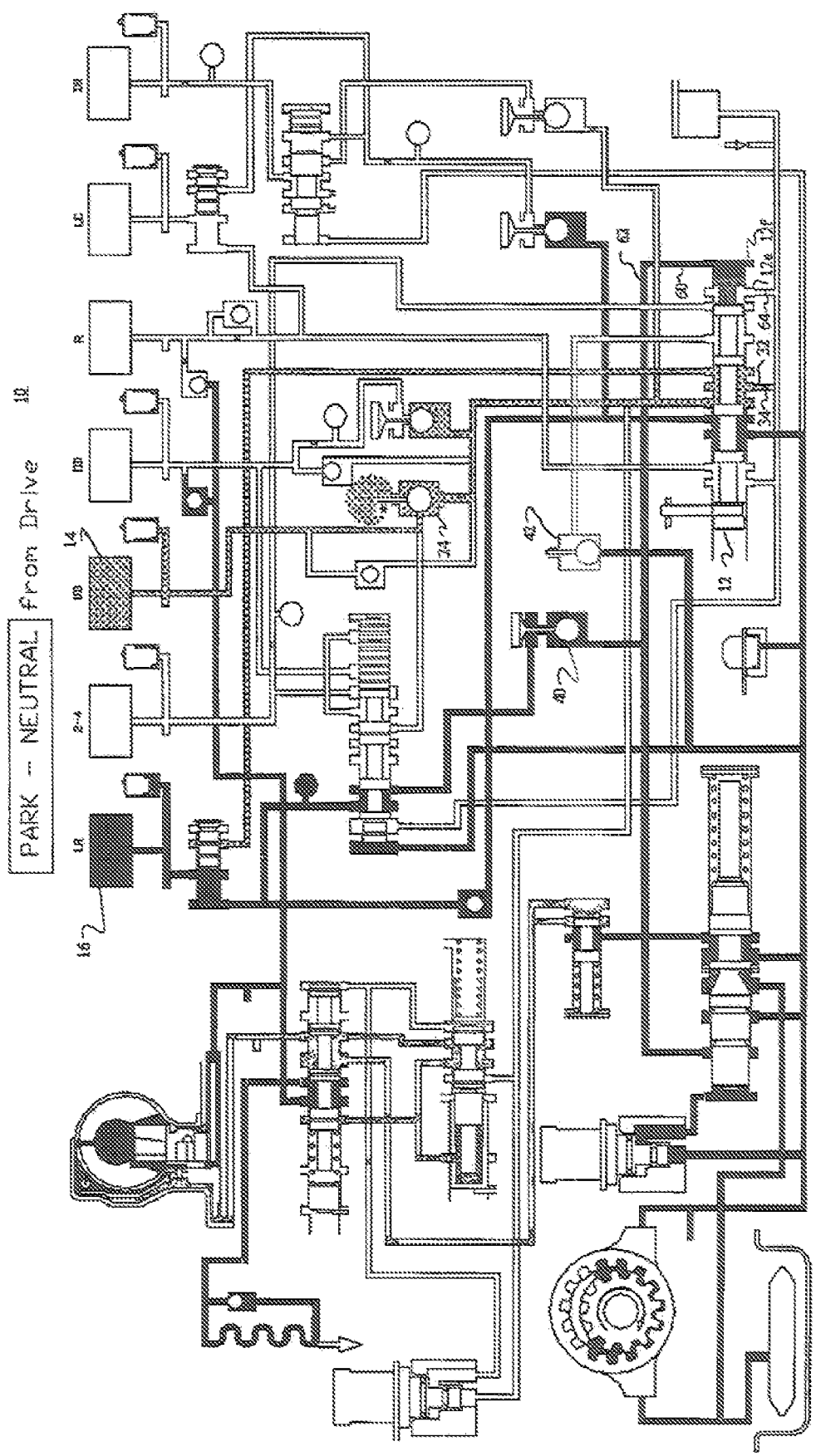

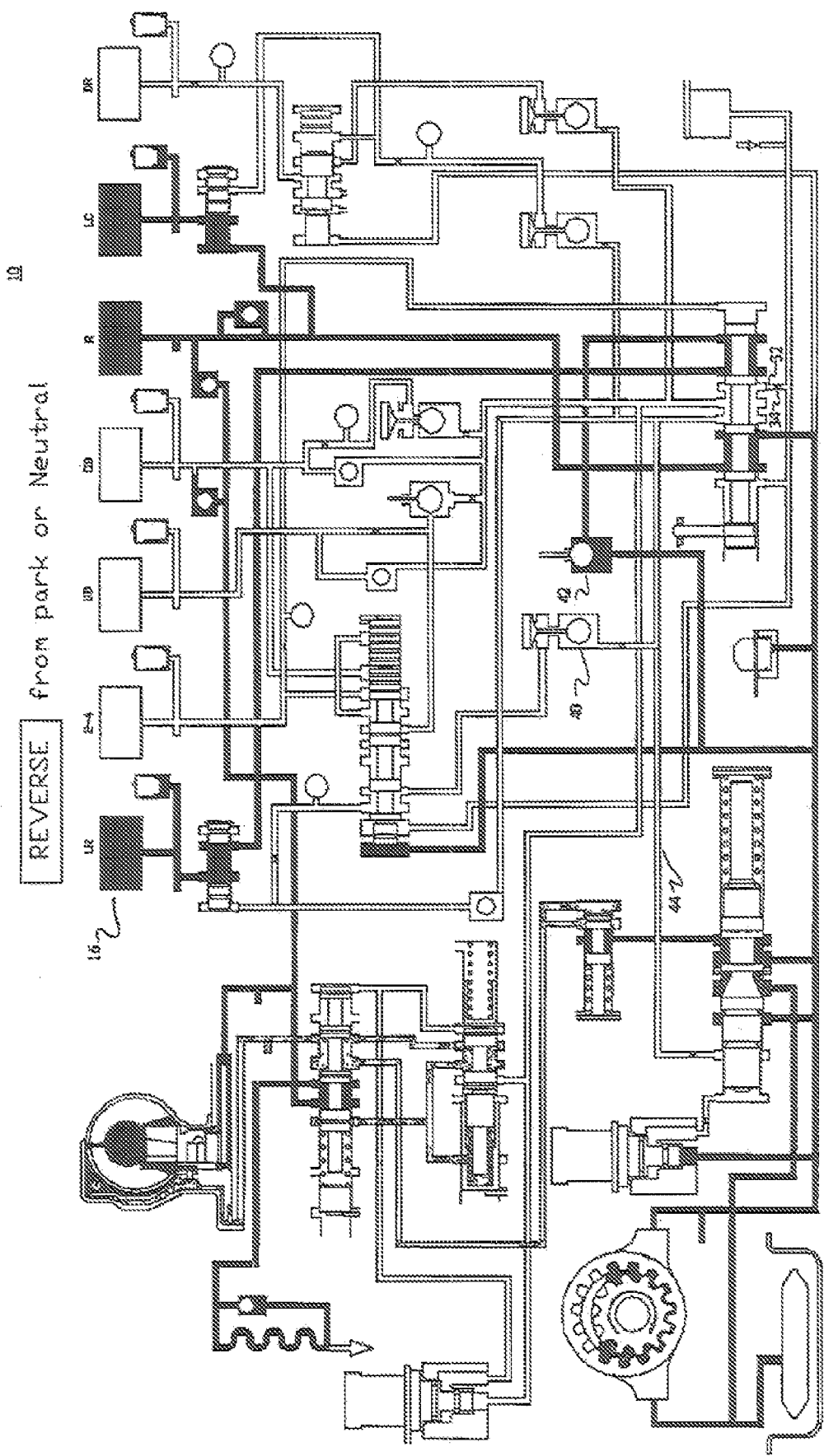

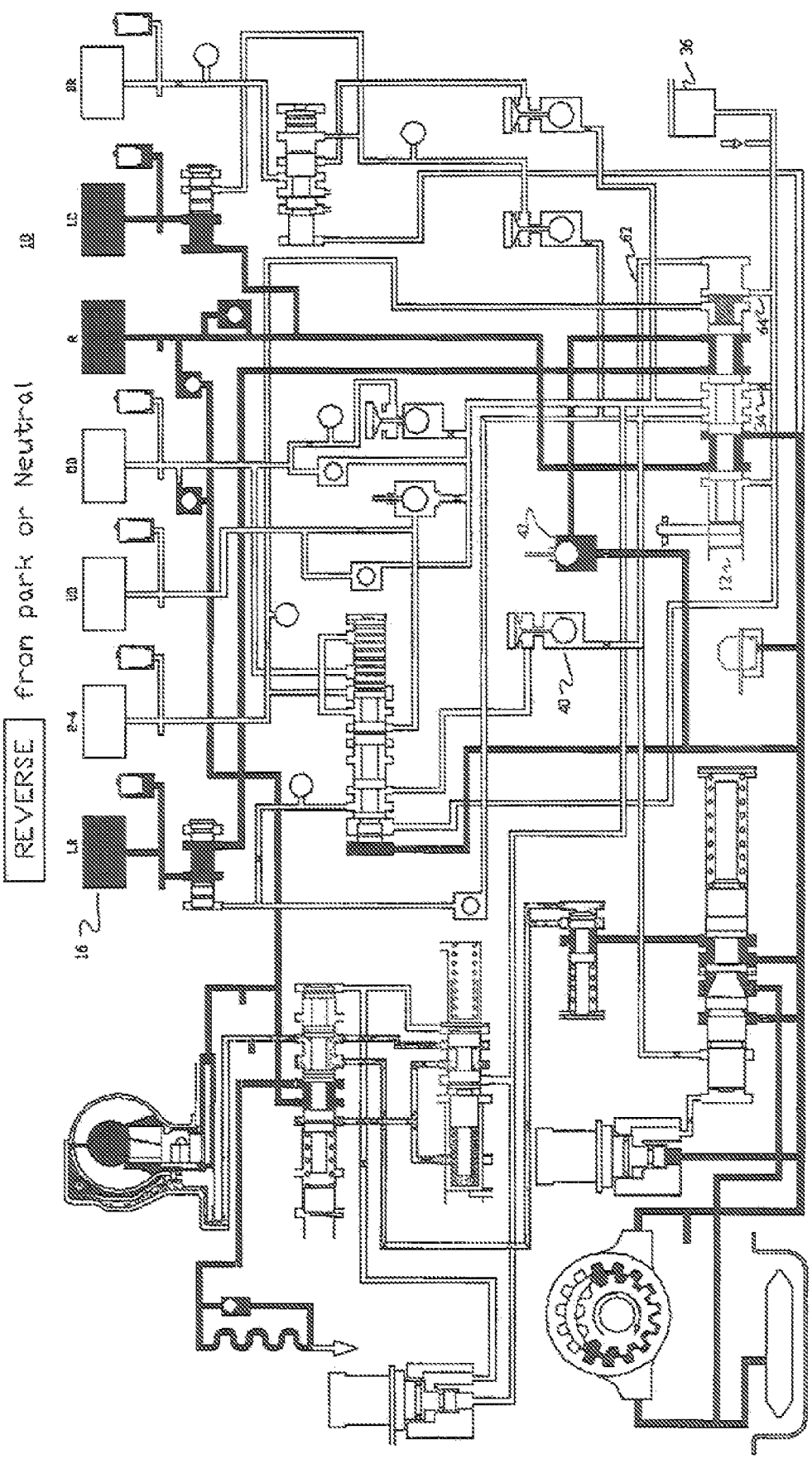
FIGURE 6  REVERSE from park or Neutral

AUTOMATIC TRANSMISSION WITH IMPROVED SHIFT QUALITY

FIELD OF THE INVENTION

The present invention relates generally to a hydraulic control system used in an automatic transmission for a vehicle, and more particularly to an apparatus which improves the automatic transmission's ability to shift smoothly into either park or neutral.

BACKGROUND

A conventional automatic transmission used in vehicles generally includes a multi-stage gear mechanism, a torque converter connected thereto, and a plurality of clutch elements actuated by hydraulic pressure for selecting one of the gears of the gear mechanism. An electronic hydraulic control system for an automatic transmission operates by selectively supplying hydraulic pressure from a hydraulic pump to the clutch elements by a plurality of control valves such that shifting may be realized automatically according to the driving situation.

The hydraulic control system generally includes a hydraulic fluid source, a line pressure controller for regulating hydraulic pressure supplied from the fluid source to line pressure, and a hydraulic pressure distributor for determining a hydraulic flow path corresponding to the respective transmission speeds according to the hydraulic pressure from the shift controller and suitably distributing the operational pressure to each friction element.

When a user desires to change the gear selection in the vehicle, for example from Drive to Park or Drive to Neutral, the flow of hydraulic fluid to one or more clutch mechanisms is either enabled or interrupted depending on the particular gear selected. In current designs the flow, or interruption of flow, of fluid and consequently the engagement or disengagement of these clutches, can be abrupt. The rapid change of states within the transmission can result in a clunky or bumpy feeling in the transmission when the transmission can result in a clunky or bumpy feeling in the transmission when the transmission is shifted from a drive gear to either Neutral or Park, as energy that had previously been stored in the driveline in rapidly released. As users may perceive this feeling as a defect or poor design in the transmission, it is desirable to reduce this sensation as much as possible.

Therefore, it is desirable to provide an automatic transmission with the ability to smoothly transition between gears, particularly between the Drive and Neutral and Drive and Park gears.

SUMMARY OF THE INVENTION

It is an object of the present invention to provide a vehicle automatic transmission with improved shift quality.

It is another object of the present invention to provide a vehicle automatic transmission with the ability to control the release of energy stored in the driveline when the transmission is shifted from Drive to either Park or Neutral.

It is yet another object of the present invention to provide a vehicle automatic transmission with an improved capability of facilitating the gradual release of hydraulic pressure, and consequently the controlled gradual release of energy stored in the vehicle driveline.

It is yet another object of the invention to provide a vehicle automatic transmission with the ability to control the release of energy stored in the driveline when the transmission is shifted from Drive to either Park or Neutral, yet still retain the ability to make rapid swaps between solenoids when the transmission is shifted from Park or Neutral to Reverse.

The present invention obtains these and other objects by providing a new configuration for the manual valve in a automatic transmission. In a preferred embodiment of the present invention, the manual valve is modified to include an additional control apparatus which may take the form of a narrowing of a port from the manual valve and modifications to the manual valve, its porting and communication passages. Generally, this control apparatus will be placed in the hydraulic circuit which connects the manual valve with the hydraulic fluid reservoir, although other placements are possible without deviating from the scope of the invention. This control apparatus allows for the gradual venting of hydraulic fluid following a gear shift. More specifically, the control apparatus allows for the gradual release of hydraulic pressure from the underdrive clutch following a shift from Drive to either Neutral or Park. The gradual release of hydraulic pressure provides additional time during which the underdrive solenoid remains pressurized, giving the solenoid an opportunity to, in connection with the control apparatus, slowly disengage the underdrive clutch. By slowly disengaging this clutch, the abrupt, clunky or bumpy sensation to the driver is lessened.

In an alternate embodiment of the present invention, additional hydraulic circuitry may be added to the transmission to optimize additional functions affected by the addition of the control apparatus. Specifically, in some applications, the addition of the disclosed control apparatus may have an effect on the ability of the transmission to rapidly switch between control apparatus during gear shifts. For example, it is known that in some transmissions, when shifting gears from park or neutral, it is necessary make a rapid swap between one or more control solenoids while keeping certain clutches, such as the low reverse clutch, engaged. Because the addition of the control apparatus will not allow for the rapid draining of hydraulic pressure from some circuits, it is necessary in some applications to provide means for circumventing the control apparatus.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description. Furthermore, the figures shown are specific to only one particular automatic transmission. However, the present invention is applicable to any number of automatic transmissions, and the particular circuitry illustrated should not be taken as a limitation of the present invention.

BRIEF DESCRIPTION OF THE DRAWINGS

The present invention will become fully understood from the detailed description and the accompanying drawings, wherein:

FIG. 4 is a schematic view of the hydraulic control system of an automatic transmission according to the principles of the present invention wherein the automatic transmission is engaged in a Drive gear.

FIG. 5 is a schematic view of the hydraulic control system of a standard automatic transmission engaged in the Reverse gear.

FIG. 6 is a schematic view of the hydraulic control system of an automatic transmission according to the principles of the present invention wherein the automatic transmission is engaged in the Reverse gear.

DETAILED DESCRIPTION OF THE PREFERRED EMBODIMENTS

Figure 1:
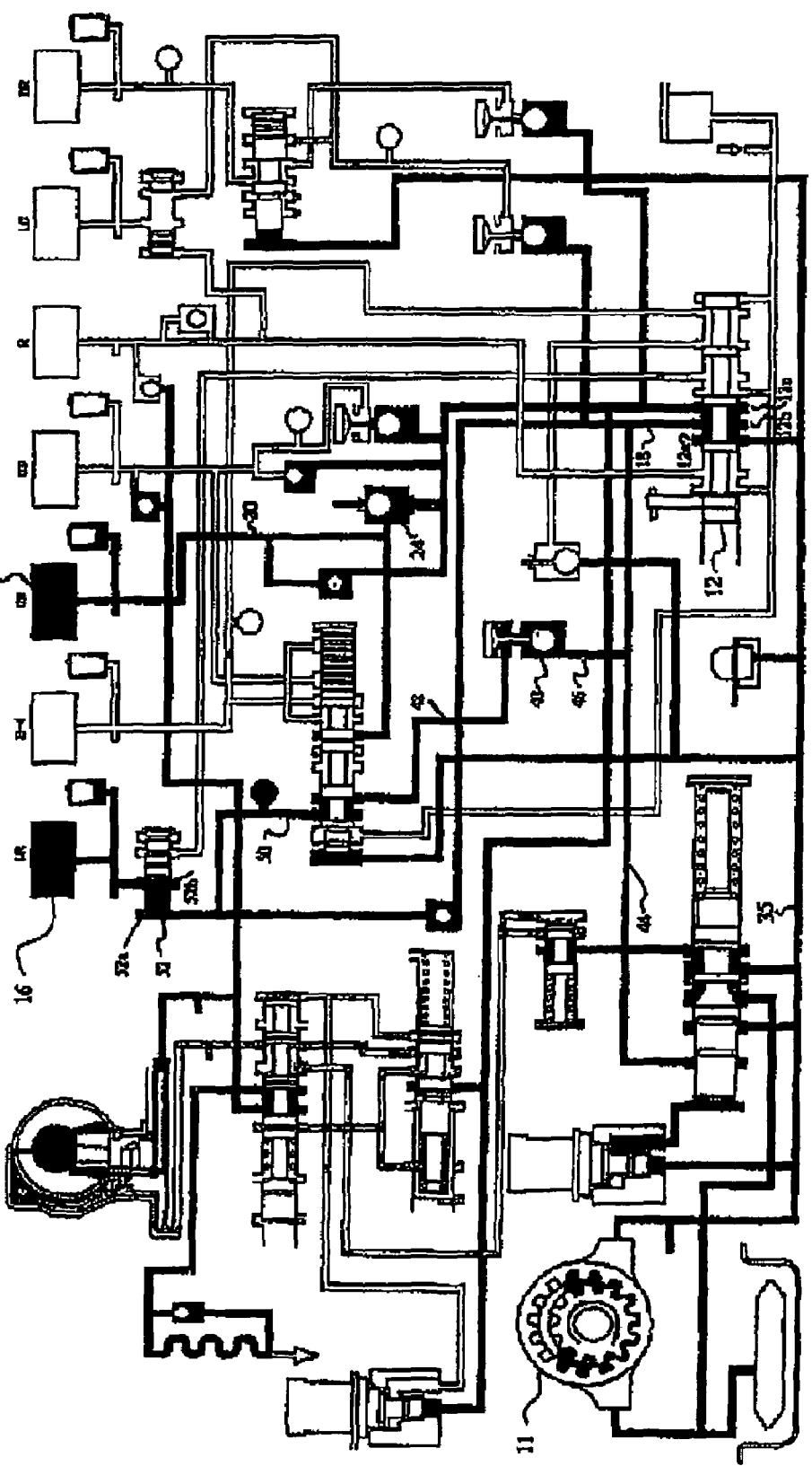
FIG. 1 is a schematic view of the hydraulic control system of a standard automatic transmission engaged in a Drive gear.

With reference to FIG. 1, a hydraulic control system 10 for controlling the operation of a six-speed automatic transmission is shown according to the principles of the present invention. However, it will be understood that the scope of the present invention should not be limited to this particular type of transmission.

As is known, when the transmission is in use, the operator of the vehicle selects a transmission gear using a lever or other control connected to the manual valve 12. The communication between the pressurized fluid source 11 and the clutches, specifically underdrive clutch 14 and how reverse Clutch 16, is through the manual valve 12 which by virtue of its position enables pressurized flow to be transmitted via the respective ports, passages and solenoids. When the manual valve is in the drive "D" position (FIG. 1), pressurized hydraulic fluid is distributed to two clutches, underdrive clutch 14 and low reverse clutch 16 from a hydraulic fluid source 11, such as a pump. Manual valve 12 communicates pressurized fluid between the hydraulic fluid source 11 and low reverse clutch 16 via passage 35, through the manual valve ports 12a, 12b, and 12c, through passage 18, through passages 44 and 46, through the low reverse/converter clutch solenoid 40, through passage 48 and 50, and ports 52a and 52b in the low reverse switch valve 52. Similarly, manual value 12 provides pressurized fluid communication from the fluid source 11, through passage 35, through manual valve ports 12a, 12b, and 12c, through passage 22, through the underdrive solenoid 24, through passage 30, to the underdrive clutch 14.

Figure 2:
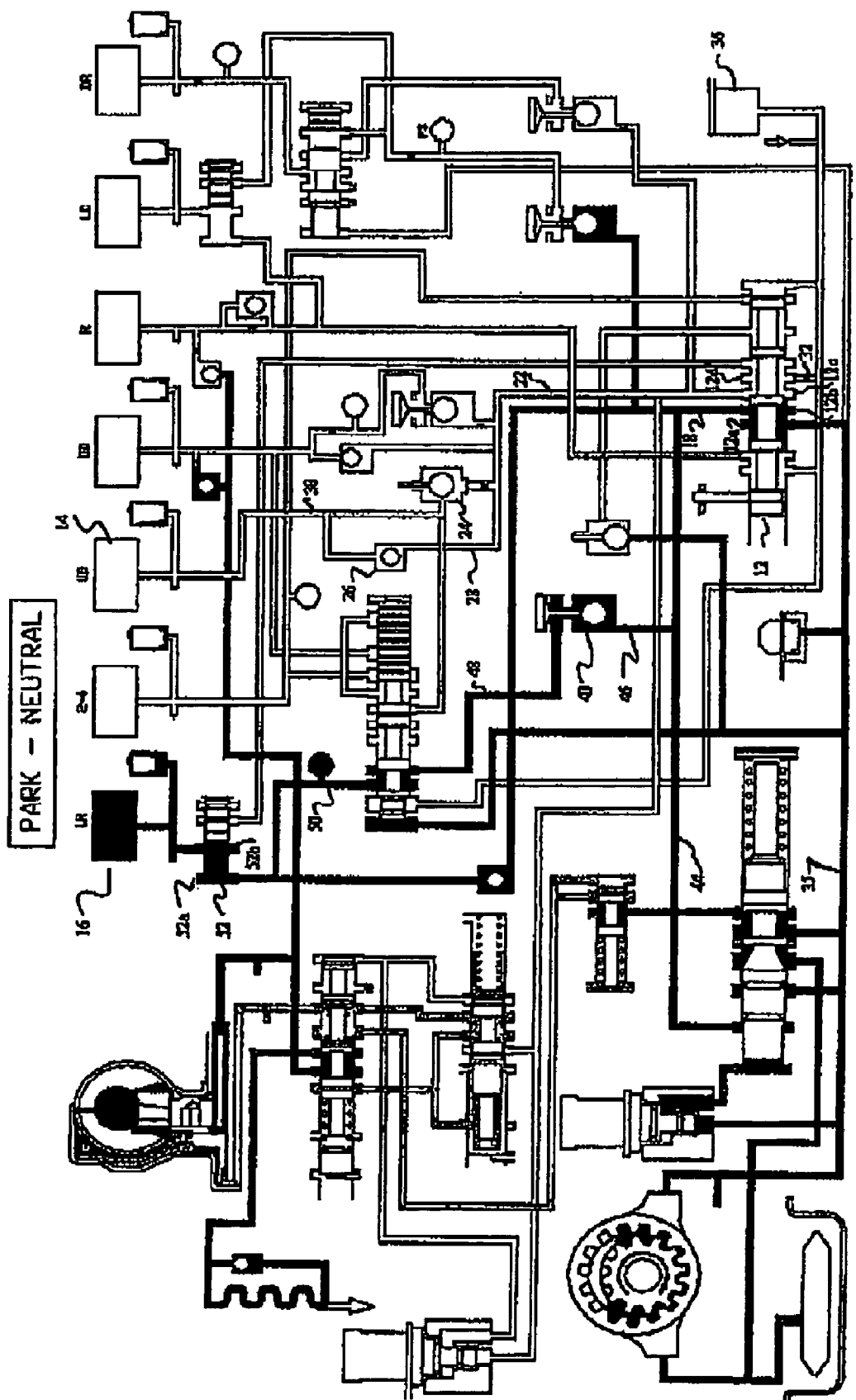
FIG. 2 is a schematic view of the hydraulic control system of a standard automatic transmission engaged in either Park or Neutral.

Turning now the FIG. 2, hydraulic control system 10 is again shown, however in this figure, manual valve 12 has been moved to the neutral/park "P" position. In this configuration, low reverse clutch 16 is still provided with pressurized hydraulic fluid via passage 35, through the manual valve ports 12a and 12b, through passage 18, through passage 44, through passage 46, through the low reverse solenoid 40, through passages 48 and 50, and ports 52a and 52b in the low reverse switch valve 52. However, unlike in FIG. 1, high pressure hydraulic fluid has been quickly vented away from underdrive clutch 14 through passage 30, ball check 26, passage 28, underdrive solenoid 24, passage 22, ports 12c and 12d of manual valve 12, through passage 32, to vent reservoir 36. Because there is no flow to underdrive solenoid 24, underdrive solenoid 24 is not able to modulate the release of pressure form underdrive clutch 14 through manual value 12 to vent reservoir 36 and as result, there is a sudden release of pressure from the underdrive clutch 14. As a result of this sudden release of underdrive clutch 14, energy which had been stored in the driveline (not shown) is also quickly released. This release results in a physical sensation and audible noise being transmitted to the operator. As has been previously described, it is advantageous to eliminate or significantly reduce these responses.

Figure 3:
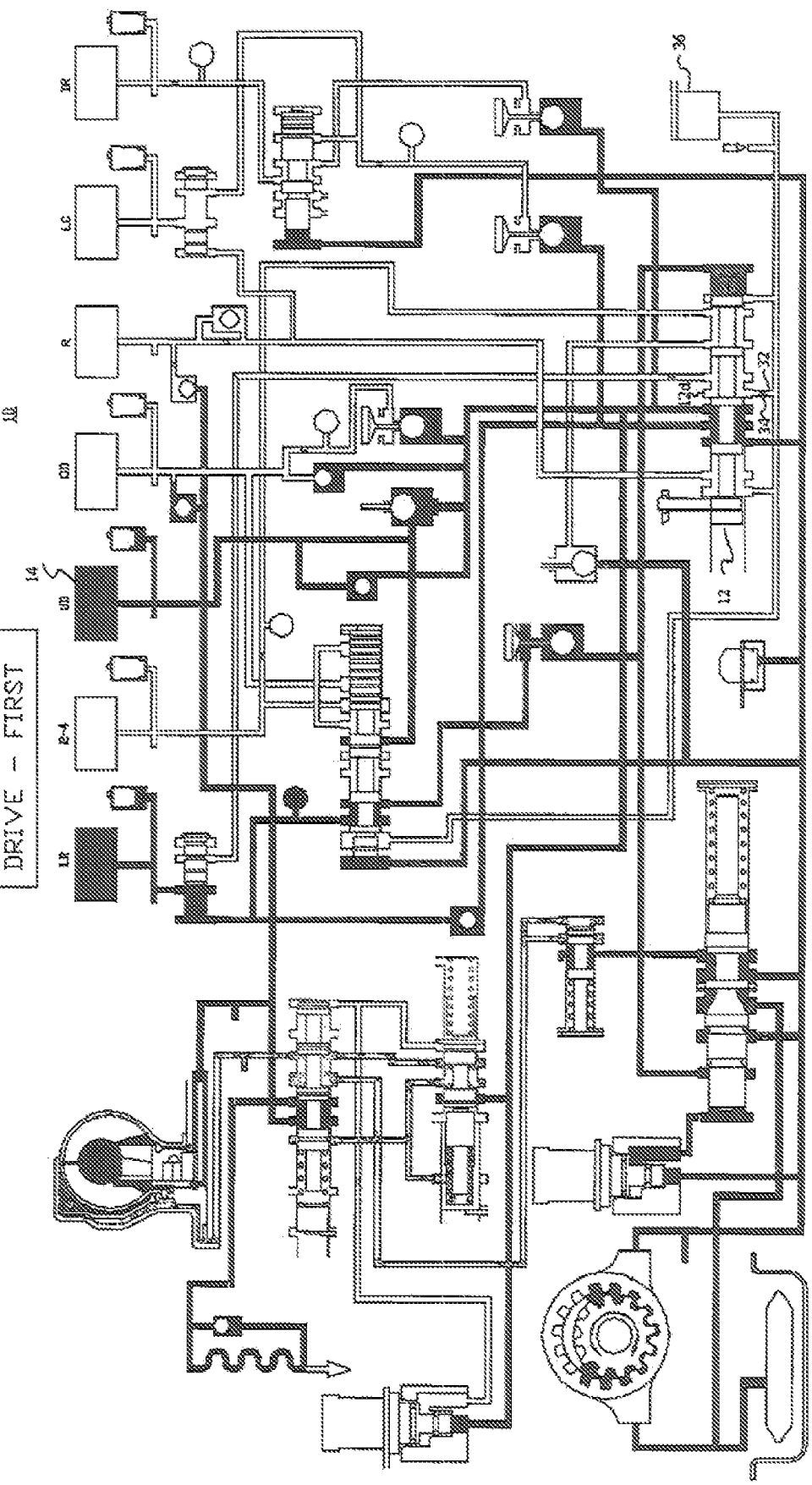
FIG. 3 is a schematic view of the hydraulic control system of an automatic transmission according to the principles of the present invention wherein the automatic transmission is engaged in a Drive gear.

Turning now to FIG. 3, hydraulic control system 10 is again shown with the transmission in one of the drive gears as in FIG. 1. However, in FIG. 3, the improvement of the present invention is also shown. In particular, control orifice 34 is places in passage 32 communicating to port 12d of manual valve 12 which vents the pressure from the underdrive clutch 14 to vent reservoir 36. In a preferred embodiment, control orifice 34 is a narrowing of an existing port. Preferably, the inside diameter of control orifice 34 will be in the range of 0.8 millimeters to 1.0 millimeters, although other sizes would be effective without departing from the scope of the invention depending on the application.

Finally, in FIG. 4, hydraulic control system 10 is again depicted, however, in this figure the transmission has been shifted by the user into park/neutral. Control orifice 34, in passage 32, slows down the vent rate of the underdrive clutch 14. Subsequently, pressure from underdrive clutch 14 is released slowly through orifice 34, and it is still available at the underdrive solenoid 24. As result the underdrive solenoid 24 can modulate the release rate of the underdrive clutch 14 by venting out the pressure in the underdrive clutch at a rate which achieves a good shift quality.

In addition to control orifice 34, in a alternate embodiment, manual valve 12 may be modified to include additional manual valve 60, an additional passage 62, and an additional passage 64 in fluid communication with passage 62 via ports 12e and 12f in manual valve 12. The purpose of this additional circuitry is to allow for a fast swap between solenoids as required in some gear changes. For example, in some applications, when a shift is made into the reverse gear from park or neutral, it is necessary to retain pressure to low reverse clutch 16. When the park or neutral gears are selected, pressure to low reverse clutch 16 is maintained through the low reverse/converter clutch solenoid 40. However, when the reverse gear is selected, pressure must be maintained through low reverse/2-4 solenoid 42.

Turning to FIG. 5 which shows hydraulic control system 10 in the reverse gear and also shows control orifice 34, but does not include additional passage 62 and 64 or manual valve land 60, it can be seen that low reverse/converter clutch solenoid 40 vents through manual valve 12 via passage 44. However, the addition of control orifice 34 in passage 32 prevents the rapid venting of this fluid which in turn interferes with the engagement of the low reverse/2-4 solenoid 42. The low reverse/2-4 solenoid 42 must take over for the low reverse/converter clutch solenoid 40 to keep pressure in the low reverse clutch 16. Turning to FIG. 6, to circumvent control orifice 34, passage 62 provides a route between low reverse/converter clutch solenoid 40 and manual valve 12 which allows the quick venting of hydraulic fluid from low reverse/converter clutch solenoid 40, through passage 64, to vent reservoir 36, while bypassing control orifice 34. Thus, fluid is able to rapidly vent from low reverse/converter clutch solenoid 40 and the swap to low reverse/2-4 solenoid 42 is completed quickly.

The invention being thus described, it will be obvious that the same may be varied in many ways. Such variations are not to be regarded as a departure form the spirit and scope of the invention, and all such modifications as would be obvious to one skilled in the art are intended to be included within the scope of the following claims.

What is claimed is:

1. A hydraulic control system for an automatic transmission comprising:

hydraulic fluid;

a plurality of clutch mechanisms;

a plurality of means for controlling said clutch mechanisms;

a manual valve selectably movable between a plurality of positions and in fluid communication with a hydraulic fluid reservoir and said plurality of means for controlling said clutch mechanisms and operable to regulate the flow of said hydraulic fluid to said plurality of means for controlling said clutch mechanisms;

an orifice for controlling the flow of said hydraulic fluid from said manual valve to said hydraulic fluid reservoir; and a means for selectively bypassing said orifice to prevent said hydraulic fluid from passing through said orifice.

2. The hydraulic control system of claim 1 wherein said plurality of clutch mechanisms include at least a first clutch and said plurality of means for controlling said clutch mechanisms includes at least a first valve.

3. The hydraulic control system of claim 2 wherein said manual valve is operable to allow flow of said hydraulic fluid from said first valve to said hydraulic fluid reservoir.

4. The hydraulic control system of claim 3 wherein said orifice is operable to control the flow of said hydraulic fluid from said first valve to said hydraulic fluid reservoir.

5. The hydraulic control system of claim 4 wherein said orifice includes an interior diameter of between 0.8 millimeters and 1.0 millimeters.

6. The hydraulic control system of claim 1 wherein said means for bypassing said orifice includes at least one conduit in fluid communication with said hydraulic fluid reservoir.

7. A hydraulic control system for an automatic transmission comprising:

hydraulic fluid;

a manual valve in fluid communication with a hydraulic fluid reservoir and operable between a plurality of positions including at least a first position and a second position;

a first clutch;

a second clutch;

a first solenoid in fluid communication with said manual valve and said first clutch;

a second solenoid in fluid communication with said manual valve and said second clutch;

means for controlling the flow of hydraulic fluid between said manual valve and said hydraulic fluid reservoir;

wherein when said manual valve is in said first position, hydraulic pressure is maintained between said first clutch, said first solenoid and said manual valve and between said second clutch, said second solenoid and said manual valve; and wherein when said manual valve is in said second position hydraulic pressure is maintained between said first clutch, said first solenoid and said manual valve, and hydraulic fluid is allowed to vent from said second clutch and said second solenoid through said manual valve.

8. The hydraulic control system of claim 7 wherein said means for controlling the flow of said hydraulic fluid from said manual valve to said hydraulic fluid reservoir is a passageway with an interior diameter of between 0.8 millimeters and 1.0 millimeters.

9. The hydraulic control system of claim 8 further comprising means for bypassing said means for controlling the flow of said hydraulic fluid from said manual valve to said hydraulic fluid reservoir.

* * * * *